United States Patent [19]

Nigrin et al.

[11] Patent Number: 5,194,303
[45] Date of Patent: Mar. 16, 1993

[54] ADDITIVES FOR LEAD- AND CADMIUM-FREE GLAZES

[75] Inventors: Jaroslava M. Nigrin; Kathleen A. Wexell; Dale R. Wexell, all of Corning, N.Y.

[73] Assignee: Corning Incorporated, Corning, N.Y.

[21] Appl. No.: 724,125

[22] Filed: Jul. 1, 1991

[51] Int. Cl.⁵ ............................................... B05D 3/02
[52] U.S. Cl. .................................. 427/376.2; 427/215; 427/217; 427/242
[58] Field of Search ............. 427/215, 217, 242, 376.2

[56] References Cited

U.S. PATENT DOCUMENTS

| 4,025,667 | 5/1977 | Tomb et al. | 427/215 |
| 4,130,671 | 12/1978 | Nagesh et al. | 427/125 |
| 4,446,241 | 5/1984 | Francel et al. | 501/14 |

*Primary Examiner*—Shrive Beck
*Assistant Examiner*—David M. Maiorana
*Attorney, Agent, or Firm*—C. S. Janes, Jr.

[57] ABSTRACT

This invention relates to a method for eliminating the grayish discoloration which commonly develops when lead-free and cadmium-free glass frits are applied to substrates utilizing an organic medium and thereafter fired to fuse the frit particles into a glaze. The grayish discoloration contains a carbonaceous residue from the organic medium. The method comprises the four general steps:

(1) adsorbing a coating of a strongly oxidizing metal ion species onto the surface of the frit particles;
(2) mixing the coated frit particles with an organic medium;
(3) applying that mixture to a substrate; and
(4) firing the mixture to eliminate the organic medium and to oxidize the carbonaceous residue while fusing the frit particles into a glaze.

3 Claims, No Drawings

ADDITIVES FOR LEAD- AND CADMIUM-FREE GLAZES

RELATED APPLICATION

U.S. application Ser. No. 07/724,126, filed concurrently herewith by J. M. Nigrin et al. under the title TRANSPARENT LEAD- AND CADMIUM-FREE GLAZES, is directed to means for preventing the development of a grayish discoloration commonly observed when precursor glass frit compositions free from lead and cadmium were applied to a substrate utilizing an organic vehicle and then fired to form a transparent, "water white" glaze coating on the substrate. Analyses of the gray discoloration had determined the cause thereof to be the presence of a carbonaceous residue. The foundation of the inventive subject matter of Ser. No. 07/724,126 resides in the inclusion of tin oxide in the base frit composition to either catalyze or directly assist in the oxidation of the organic material (carbonaceous residue) and thereby eliminate the grayish discoloration. The inclusion of tin oxide to preclude the generation of the undesired gray tint was found to be operable across the spectrum of glass frits. The text of Ser. No. 07/724,126 is incorporated herein by reference.

BACKGROUND OF THE PRESENT INVENTION

Whereas the inclusion of tin oxide in lead-free and cadmium-free frits has demonstrated essentially universal effectiveness in eliminating the endemic grayish discoloration witnessed in the firing of those frits, a substantial concentration of tin oxide, generally at least 1.5% by weight, was required to assure complete removal of the discoloration. Because of the inherent cost of tin oxide, other means were investigated concurrently to accomplish the same goal, but without the need for such substantial levels of tin oxide.

Hence, the principal objective of the present invention was to devise means for treating lead-free and cadmium-free frits to assure the absence of the grayish discoloration after firing, which means would not involve the incorporation of substantial amounts of tin oxide in the frit composition.

A complementary objective was to not only achieve the above principal objective, but also, at the same time, to make certain that the resultant glazes were not so altered thereby that their physical and chemical properties, e.g., their softening point, their linear coefficient of thermal expansion, and their resistance to alkaline detergents, were not deleteriously affected.

SUMMARY OF THE INVENTION

The present invention was founded in the speculation that the addition of appropriate oxidizers and/or oxidation catalysts to the mixture of frit and organic medium could effect the same result as the addition of tin oxide to the base frit combination. Stated in more specific terms, the subject invention is based in the discovery that, by incorporating an effective amount of oxidizing agents and/or oxidizing catalysts, with particular emphasis on compounds of manganese, tin, titanium, and zinc, into the mixture of base glass frit and the organic vehicle, the occurrence of the grayish discoloration can be inhibited. In general, an amount of additive expressed in terms of metal oxide, e.g., $Mn_2O_3$, $SnO_2$, $TiO_2$, and reduced ZnO, of no more than 1% by weight has proven essentially universally effective, with 0.5% being operable in some instances. Greater amounts can be used without injury, for example, up to 2% and higher, but with no substantial advantage and at added cost. Accordingly, 0.5% by weight has been deemed a practical minimum level and 2% by weight as an unnecessarily high maximum, with about 1% by weight being preferred. The expression "essentially free from gray discoloration" is employed to avoid a possible problem arising where the discoloration may be so faint as to be unobjectionable to the eye, but which could be measured instrumentally.

GENERAL DESCRIPTION OF THE INVENTION

As has been explained above, the mechanism underlying the elimination of the grayish discoloration from the lead-free and cadmium-free frit compositions has been posited as involving the catalytic or direct oxidative activity of the metal species in the glass. The reliability of that posit is strengthened by the fact that $Mn^{+3}$, $SnO_2$, $TiO_2$, and reduced ZnO, as known oxidizing agents, are very effective in the 200°-550° C. temperature range for the oxidation of numerous species; that temperature range serendipitously corresponding to the decomposition range of the conventional organic media utilized in the firing of decorative frits.

Whereas laboratory investigations have indicated that the above four oxidizing agents can prevent the generation of a gray tint during the firing of a wide variety of frit compositions, the present invention was necessitated by the development of a gray discoloration during the glazing of CORELLE® tableware marketed by Corning Incorporated, Corning, N.Y., which discoloration caused the ware to be rejected. Therefore, because of the extensive laboratory work which was conducted to solve that problem, the instant invention will be described in detail as applied to that tableware.

A lead-free and cadmium-free frit composition had been developed for that tableware by Corning Incorporated under the designation E-1809. That frit, included within U.S. Pat. No. 4,590,171 (Nigrin), consisting essentially, expressed in terms of weight percent on the oxide basis as calculated from the batch, of

| | | | |
|---|---|---|---|
| $Li_2O$ | 3.23 | $B_2O_3$ | 15.5 |
| $Na_2O$ | 2.46 | $SiO_2$ | 48.8 |
| CaO | 0.96 | $TiO_2$ | 2.01 |
| ZnO | 1.43 | $ZrO_2$ | 7.77 |
| BaO | 7.17 | F | 3.72 |
| $Al_2O_3$ | 6.78 | | | was subject to the grayish discoloration when fired in accordance with the relatively short time, low temperature glazing schedule currently employed with the commercially marketed lead-containing frit. The firing schedule utilized in maturing the lead-containing frit comprised heating the frit-coated ware from room temperature to about 750°-760° C. within a period of about 5-8 minutes and thereafter air chilling the glazed ware. However, that frit and other compositions contained within the scope of U.S. Pat. No. 4,590,171 required longer maturing times and/or higher firing temperatures to preclude the production of the grayish discoloration, both of those procedures adding substantial cost. Yet, those frit compositions, when matured into a glaze, exhibited physical and chemical properties rendering them eminently suitable for use in decorating CORELLE® tableware; that is, they displayed high gloss, they demonstrated linear coefficients of thermal expansion compatible with that of the tableware ($\sim 57$–$62\times 10^{-7}$/°C. over the temperature range 20°–300° C.), softening points between about 600°–625° C., and they manifested excellent resistance to attack by alkaline detergents such as are used in commercial dishwashers.

In view of the above circumstances, a research program was begun to discover means for expediting the removal of the carbonaceous residue commonly occurring when frits having compositions within the text of U.S. Pat. No. 4,590,171 were fired following the schedule used for lead-containing frits. Thus, maturation temperatures below 775° C. were desired, with temperatures no higher than 750°–760° C. being preferred.

Whereas the incorporation of an oxidizing agent and/or oxidizing catalyst into a mixture of base glass frit and organic vehicle has been demonstrated in our laboratory to inhibit the development of the undesirable grayish discoloration during the firing of a wide variety of frit compositions, because the present invention was directed to solving the discoloration problem in frit compositions encompassed within U.S. Pat. No. 4,590,171, it will be described with particularity in its applicability to those frits. Those frit compositions consisted essentially, expressed in terms of weight percent on the oxide basis, of

| | | | | | |
|---|---|---|---|---|---|
| $Li_2O$ | 3–4 | $ZrO_2$ | 6.75–10 | $Sb_2O_3$ | 0–5 |
| $Na_2O$ | 0.75–3 | F | 3–4 | $SnO_2$ | 0–2 |
| BaO | 3.5–9.5 | $Bi_2O_3$ | 0–3 | SrO | 0–2 |
| $B_2O_3$ | 14–17.5 | CaO | 0–1.5 | $TiO_2$ | 0–3 |
| $Al_2O_3$ | 6.75–8.75 | $K_2O$ | 0–2 | ZnO | 0–2.5 |
| $SiO_2$ | 48–55 | $Bi_2O_3 + CaO + K_2O + Sb_2O_3 + SnO_2 + SrO + TiO_2 + ZnO$ | | | 0–7.5 |

Whereas $SnO_2$ is noted as being a possible optional component, no specific utility is assigned therefor and it appears in but one example in the patent, viz., a comparison example having a composition outside of the ranges needed to achieve a desirable glaze. Furthermore, no reference is made to the development of a grayish discoloration during firing and the frits were fired at temperatures higher than those desired with the present inventive frits.

PRIOR ART

Because of the concern about the toxicity of lead and cadmium, especially when products containing those ingredients are to be used in contact with food, considerable research has been undertaken to develop lead-free and cadmium-free glaze. The following U.S. Pat. Nos. are illustrative of that research, but none describes the present inventive method.

| | |
|---|---|
| 4,224,074 (Reade) | 4,446,241 (Francel et al.) |
| 4,282,035 (Nigrin) | 4,537,862 (Francel et al.) |
| 4,285,731 (Nigrin) | 4,814,298 (Nigrin) |
| 4,315,778 (Ueno et al.) | 4,877,758 (Lee et al.) |

DESCRIPTION OF PREFERRED EMBODIMENTS

Various compounds containing the oxidizing agent/oxidizing catalyst were dissolved in distilled water or a 1:1 solution of distilled water and isopropyl alcohol. E-1809 frit having an average particle size of about 6–7 microns (250–500 $m^2$/g surface area range) was admixed into that solution and allowed to roll gently overnight in a plastic container. The solutions were formulated to provide sufficient metal ion to effect coverage of the frit particles. In general, two solutions were employed to yield frit with 0.5% and 1.0% by weight additive, respectively. The solutions were filtered off the coated frit and the frit allowed to dry at room temperature in flowing air. The coated frits were then admixed into No. 175 screening oil marketed by Drakenfeld Colors, Washington, Pennsylvania, or PT 47, an organic thermoplastic binder system developed by Corning Incorporated, respectively. The frits admixed with the screening oil were silk screened onto 6.5" diameter CORELLE ® plates and fired by heating from room temperature to 750°–760° C. within 5.5 minutes and thereafter air chilled to room temperature. The PT 47 material was preheated in a microwave oven to impart sufficient fluidity therein to permit admixing the frit. The frit/PT 47 medium mixture was swatched onto a hot CORELLE ® 6.5" diameter plate between strips of masking tape utilizing a doctor blade to produce a film of about 1 mm thickness. The samples were then fired to 750°–760° C. within 8 minutes and thereafter air chilled to room temperature.

The following tin-containing compounds were examined in accordance with the above-described procedure: stannous (II) acetate; stannous (II) chloride; stannous (II) octoate; stannous (II) palmitate; stannous (II) stearate; stannic (IV) acetate; and stannic (IV) chloride. A visual comparison was made between the appearances of the glazes resulting from having the above materials mixed with the E-1809 frit and the E-1809 frit alone. The qualitative assignments of grayness exhibited are set out below:

| | |
|---|---|
| Very Gray = | more gray than E-1809 alone; |
| Gray = | same grayness as E-1809 alone; |
| Slightly Gray = | significantly less gray than E-1809 above; and |
| Very Slightly Gray = | grayness barely perceptible. |

The results of that series of tests are reported below in Table I wherein "PrOH" represents isopropyl alcohol.

TABLE I

| Compound | Solvent | Amount of Additive | Medium | Apperance Of Glaze |
|---|---|---|---|---|
| Sn(II) Acetate | $H_2O$ | 0.5% | 175 oil | Slightly Gray |
| | $H_2O$ | 1.0% | 175 oil | No Gray |
| | $H_2O$ | 0.5% | PT 47 | Slightly Gray |
| | $H_2O$ | 1.0% | PT 47 | No Gray |
| Sn(II) Chloride | $H_2O$ | 0.5% | 175 oil | Slightly Gray |
| | $H_2O$ | 1.0% | 175 oil | No Gray |
| | $H_2O$ | 0.5% | PT 47 | Slightly Gray |
| | $H_2O$ | 1.0% | PT 47 | No Gray |
| Sn(II) Octoate | $H_2O$:PrOH | 0.5% | 175 oil | Very Slightly Gray |
| | $H_2O$:PrOH | 1.0% | 175 oil | No Gray |
| | $H_2O$:PrOH | 0.5% | PT 47 | Very Slightly Gray |
| | $H_2O$:PrOH | 1.0% | PT 47 | No Gray |
| Sn(II) Palmitate | $H_2O$:PrOH | 0.5% | 175 oil | Gray |
| | $H_2O$:PrOH | 1.0% | 175 oil | Gray |
| Sn(II) Steareate | $H_2O$ | 0.5% | 175 oil | Very Gray |
| | $H_2O$ | 1.0% | 175 oil | Very Gray |
| Sn(IV) Acetate | $H_2O$ | 0.5% | 175 oil | Very Gray |
| | $H_2O$ | 1.0% | 175 oil | Very Gray |
| | $H_2O$ | 0.5% | PT 47 | Slightly Gray |
| | $H_2O$ | 1.0% | PT 47 | No Gray |
| Sn(IV) Chloride | $H_2O$ | 0.5% | 175 oil | Very Gray |
| | $H_2O$ | 1.0% | 175 oil | Very Gray |

The reduced zinc oxide was prepared by dissolving 10 grams and 20 grams, respectively, in 100 ml distilled water samples. Thereafter, 50 grams of E-1809 frit were admixed into those solutions and rolled gently overnight in a plastic container. The solutions were filtered off the frits and the frits were initially dried in air at room temperature and then heated at 400° C. for one hour. Subsequently, the frits were heat treated at 450° C. for 15 minutes in an atmosphere of flowing forming gas (8% hydrogen, 92% nitrogen). The resultant frits exhibited a yellow coloration upon cooling, which color is characteristic of reduced zinc oxide. The two frits were calculated to have 0.7% and 1.4% reduced zinc oxide, respectively, on the surfaces thereof.

Solutions of 0.5% and 1.0% by weight zinc (II) formate and a zinc oxidation accelerator, AC-8, marketed by Anhydrides and Chemicals, Inc., Newark, N.J., were formulated and applied to frit particles in like manner to the tin samples described above. The zinc (II) formate was dissolved in distilled water and the AC-8 was supplied as butyl acetate (BuAc). The coated frits were admixed into No. 175 oil or PT 47 binder system, applied to 6.5" diameter CORELLE ® plates, and fired to 750°-760° C. as described above with respect to the tin-coated samples. Table II lists the results of those tests. The qualitative assignments of graying have the same meaning as in Table I.

TABLE II

| Compound | Solvent | Amount of Additive | Medium | Appearance Of Glaze |
|---|---|---|---|---|
| Zn(II) Formate | $H_2O$ | 0.5% | 175 oil | Gray |
|  | $H_2O$ | 1.0% | 175 oil | Gray |
| AC-8 | BuAc | 0.5% | 175 oil | Gray |
|  | BuAc | 1.0% | 175 oil | Very Gray |
| reduced ZnO | $H_2O$ | 0.7% | 175 oil | No Gray |
|  | $H_2O$ | 1.4% | 175 oil | No Gray |
|  | $H_2O$ | 0.7% | PT 47 | Gray |
|  | $H_2O$ | 1.4% | PT 47 | No Gray |

The yellowish coloration of the frit coated with reduced ZnO was eliminated when the frit was matured into a glaze; i.e., the reduced zinc oxide was oxidized during the firing step to the colorless ZnO species.

Mn(III) acetylacetonate is not marketed commercially as it is not stable for extended periods in air. It was made by reacting 30 grams of 1,3-dimethyl ketone with 100 ml of a 1.1M aqueous solution of $KMnO_4$ at 50° C. Dark brown crystals were removed via filtration and dried at 80° C. in an atmosphere of nitrogen.

Solutions of 0.5% and 1.0% by weight of those crystals were prepared in 1:1 solutions of distilled water and isopropyl alcohol, as were solutions of 0.5% and 1.0% by weight of Mn(II) 2,4 pentanedionate in 1:1 solutions of distilled water and isopropyl alcohol. Aqueous solutions of 0.5% and 1.0% by weight were also prepared of Mn(II) acetate.

Particles of E-1809 frit were coated with those solutions, the particles dried, admixed into No. 175 screening oil or PT 47, that mixture applied to 6.5" diameter CORELLE ® plates, and fired to 750°-760° C. as described above with respect to the tin-coated samples. Table III records the results of those tests. The qualitative assignments of graying have again the same meaning as in Table I.

TABLE III

| Compound | Solvent | Amount of Additive | Medium | Appearance Of Glaze |
|---|---|---|---|---|
| Mn(III) Acetyl-Acetonate | $H_2O$:PrOH | 0.5% | 175 oil | No Gray |
|  | $H_2O$:PrOH | 1.0% | 175 oil | No Gray |
|  | $H_2O$:PrOH | 0.5% | PT 47 | Slightly Gray |
|  | $H_2O$:PrOH | 1.0% | PT 47 | No Gray |
| Mn(II) 2,4-Pentanedionate | $H_2O$:PrOH | 0.5% | 175 oil | Very Gray |
|  | $H_2O$:PrOH | 1.0% | 175 oil | Very Gray |
| Mn(II) Acetate | $H_2O$ | 0.5% | 175 oil | Gray |
|  | $H_2O$ | 1.0% | 175 oil | Very Gray |
|  | $H_2O$ | 0.5% | PT 47 | Very Gray |
|  | $H_2O$ | 1.0% | PT 47 | Very Gray |

The dark brown color of the frit disappeared during the firing step to yield a clear colorless glaze. This disappearance of color is postulated to be due to the reduction of the Mn(III) species to the very pale pink color of Mn(II) which, at the very low levels present in the frit, is virtually colorless.

It must be recognized that there are other species of manganese containing the extremely oxidizing forms of Mn(IV), Mn(VI), and Mn(VII). Those species were not evaluated inasmuch as they readily oxidize many organic species on contact. That sensitivity was adjudged to render them too dangerous for a commercial process.

Solutions of 0.5% and 1.0% by weight of Ti(IV) in the form of titanium oxychloride and titanium diisopropoxide bis(2,4 pentanedionate), respectively, were prepared and applied to frit particles in like manner to the aforementioned tin samples. The titanium oxychloride solution was obtained by first weighing out 4 grams of titanium tetrachloride in a dry box and then reacting with 100 cc of 0.1M hydrochloric acid solution. Upon complete hydrolysis of the titanium tetrachloride, a 1.0% solution of Ti(IV) was effected. This solution was diluted by one-half with 0.1M hydrochloric acid solution to obtain the 0.5% solution of Ti(IV). The Ti(IV) species exists in solution in such forms as $Ti(OH)_2^{2+}$, $Ti(OH)Cl^{2+}$ and $Ti_2(OH)_6^{2+}$. The coated frits were dried in air and then heated at 450° C. in air for 3 hours.

The titanium diisopropoxide bis(2,4 pentanedionate) was obtained as a 75% by weight solution in isopropanol from Aldrich Chemical Co., Inc., Milwaukee, Wis. Solutions of 0.5% and 1.0% by weight of Ti(IV) were obtained by diluting the 75% solution appropriately with isopropanol. The coated frits were also dried in air and subsequently heated to 450° C. for 3 hours in air.

Both types of coated frits were admixed into No. 175 oil or PT 47 binder system, applied to 6.5" diameter CORELLE ® plates, and fired to 750°-760° C. as also described above with respect to the tin coated samples. Table IV lists the results of those tests. The qualitative assignments of graying have again the same meaning as in Table I.

TABLE IV

| Compound | Solvent | Amount of Additive | Medium | Appearance of Glaze |
|---|---|---|---|---|
| Ti(IV) oxychloride in solution | $H_2O$ | 0.5% | 175 oil | Gray |
|  | $H_2O$ | 1.0% | 175 oil | Slightly Gray |
|  | $H_2O$ | 0.5% | PT 47 | Gray |
|  | $H_2O$ | 1.0% | PT 47 | Slightly Gray |
| Ti(IV) diisopropoxide (2,4) pentanedionate | PrOH | 0.5% | 175 oil | Gray |
|  | PrOH | 1.0% | 175 oil | Slightly Gray |
|  | PrOH | 0.5% | PT 47 | Gray |
|  | PrOH | 1.0% | PT 47 | Slightly Gray |

It should be noted that direct additions of Sn(II) octoate, Sn(II) acetate, Sn(II) chloride, Ti(IV) dioxide, and reduced zinc oxide to mixtures of E-1809 in No. 175 screening oil or PT 47 binder system without the adsorption step did not reduce the grayish discoloration. In most instances graying was more severe because of inhomogeneous distribution and clumping of the additive in the medium.

In summary, it has been shown that those agents which are capable of generating a strong oxidizing species in the 200°-550° C. range, which range corresponds to the decomposition temperature interval of the organic materials in the frit/medium mixture, can eliminate graying in the fired glaze. $SnO_2$, $Mn_2O_3$, $TiO_2$, and reduced ZnO which represent the derivative species of all the respective compounds upon their decomposition, are very active in that temperature region, although with different activities, and their oxidizing benefits on the organic materials have been illustrated. It is to be noted that, in the case of the tin compounds which did act to eliminate graying, the tin coatings produced on the frit particles generally consist of some type of hydrated tin oxide species and/or carbonaceous species derived from incomplete anion decomposition which revert to $SnO_2$ only at much higher temperatures (>400° C.). The reduced zinc oxide is a known oxidizer for many organic conversions in the temperature regime of 150°-700° C. Mn(III) with its inherent instability is a strong oxidizer even at room temperature. It has also been demonstrated that the anion originally associated with the metal ion species affects the oxidizing ability of the respective metal ion in the desired temperature range cited. The Sn(II) chloride, acetate, and octoate appear to function best. That capability is believed to reside in the fact that decomposition of the anion occurs in the 200°-400° C. temperature interval, as observed in differential thermal analyses of those compounds.

We claim:

1. A method for eliminating the grayish discoloration which develops when lead-free and cadmium-free glass frit particles are applied to a substrate by means of an organic vehicle and fused to form a glaze, which discoloration is the result of a carbonaceous residue, comprising the steps of:
   (a) preparing lead-free and cadmium-free glass frit particles of a desired composition;
   (b) adsorbing a coating of a strongly oxidizing metal ion species onto the surface of said frit particles in an amount of at least about 0.5% by weight, which metal ion species is strongly oxidizing over the range of room temperature to 550° C., which, expressed in terms of metal oxide, is selected from the group consisting of $Mn_2O_3$, $SnO_2$, $TiO_2$, and reduced ZnO, and which has an anion associated therewith that decomposes over the range between room temperature and 400° C.;
   (c) mixing said coated frit particles with an organic vehicle;
   (d) applying said mixture onto a substrate; and
   (e) firing said mixture to eliminate said organic vehicle and to oxidize said carbonaceous residue while fusing said frit particles into a glaze essentially free from grayish discoloration.

2. A method according to claim 1 wherein said metal ion species is present in an amount of about 0.5-2% by weight.

3. A method according to claim 1 wherein said glass frit consists essentially, expressed in terms of weight percent on the oxide basis, of

| | | | | | |
|---|---|---|---|---|---|
| $Li_2O$ | 3-4 | $ZrO_2$ | 7.5-10 | $Sb_2O_3$ | 0-5 |
| $Na_2O$ | 0.75-3 | F | 3-4 | $SnO_2$ | 0-2 |
| BaO | 3.5-9.5 | $Bi_2O_3$ | 0-3 | SrO | 0-2 |
| $B_2O_3$ | 14-17.5 | CaO | 0-1.5 | $TiO_2$ | 0-3 |
| $Al_2O_3$ | 6.75-8.75 | $K_2O$ | 0-2 | ZnO | 0-2.5 |
| $SiO_2$ | 48-55 | $Bi_2O_3$ + CaO + $K_2O$ + $Sb_2O_3$ + $SnO_2$ + SrO + $TiO_2$ + ZnO | | | 0-7.5 |

* * * * *